United States Patent [19]

Kimura et al.

[11] Patent Number: 4,722,006
[45] Date of Patent: Jan. 26, 1988

[54] CLAMP CIRCUIT FOR A VIDEO SIGNAL PROCESSOR

[75] Inventors: Yuichirou Kimura, Yokohama; Michitaka Osawa, Fujisawa, both of Japan

[73] Assignee: Hitachi, Ltd., Tokyo, Japan

[21] Appl. No.: 844,502

[22] Filed: Mar. 27, 1986

[30] Foreign Application Priority Data

Mar. 27, 1985 [JP] Japan .................................. 60-60570
Mar. 27, 1985 [JP] Japan .................................. 60-60572

[51] Int. Cl.$^4$ .............................................. H04N 5/18
[52] U.S. Cl. ...................................... 358/171; 358/34; 358/172
[58] Field of Search ............... 358/171, 172, 173, 166, 358/29, 65, 64, 242, 34

[56] References Cited

U.S. PATENT DOCUMENTS

| | | | |
|---|---|---|---|
| 3,013,116 | 12/1961 | Sziklai | 358/172 |
| 4,070,691 | 1/1978 | Smith | 358/65 |
| 4,285,008 | 8/1981 | Osawa | 358/29 |
| 4,328,514 | 5/1982 | Nakashima | 358/34 |

Primary Examiner—Tommy P. Chin
Attorney, Agent, or Firm—Antonelli, Terry & Wands

[57] ABSTRACT

A capacitor is provided between an amplifier whose output impedance is relatively high and a cathode of a cathode ray tube. A transistor is also provided having an emitter-collector path connected in parallel with said capacitor and a base electrode which is connected to a D.C. voltage source through a switch which is turned on during a horizontal retrace period and off during a horizontal scan period. A D.C. restoring operation is achieved by causing almost all of the discharge current of the capacitor to flow through the emitter-collector path, resulting in less discharge current flow through the output impedance of the amplifier.

28 Claims, 4 Drawing Figures

CLAMP CIRCUIT FOR A VIDEO SIGNAL PROCESSOR

BACKGROUND OF THE INVENTION

This invention relates to a clamp circuit, especially to a clamp circuit provided between a final amplifier stage and a cathode of a cathode ray tube (CRT), to process a video signal having a large amplitude and a wide range of frequency components.

One example of such a clamp circuit is disclosed in U.S. Pat. No. 4,285,008, issued to Osawa et al on Aug. 18, 1981. This clamp circuit has a capacitor connected between the final amplifier stage and the cathode of the CRT, an adjustable D.C. voltage source and switching means connected between the voltage source and the connecting point of the capacitor and the cathode. The switching means is turned on during the horizontal retrace period and off during the horizontal scan period of the video scanning.

Since the final video amplifier stage in the Osawa et al clamp circuit comprises two complementary transistors connected in an emitter follower configuration to form an SEPP amplifier, if the frequency of a video signal passing therethrough is lower than 10~20 MHz, the output impedance is so low that a full D.C. restoring operation is necessitated.

In general, the capacitor connected between the pre-amplifier stage and the output device is charged (or discharged) during a non-clamping period, which is the OFF period of the switching means, in accordance with the time constant determined by the output impedance of the pre-amplifier stage and the capacitance of the capacitor during the clamping period, which is the ON period of switching means. Therefore, a constant D.C. voltage is generated at the output side of the capacitor, if the electrical charge values of the charging and discharging are balanced. A decrease of the output impedance of the pre-amplifier stage causes a decrease of the time constant; therefore, it is necessary to perform the full D.C. restoring. However, this causes an increase of power consumption in the pre-amplifier stage. Thus, there is a dilemma produced by the output impendace of the pre-amplifier stage.

SUMMARY OF THE INVENTION

It is an object of the present invention to provide a clamp circuit which is suitable for use with a pre-amplifier having a significant output impedance.

In accordance with the present invention, there is provided a source of a video signal to be processed, means for processing said video signal, a capacitor connected between said source and said processing means, a D.C. voltage source, switching means connected between said D.C. voltage source and a connecting point of said processing means and said capacitor, which switching means is turned on and off alternately for selectively connecting the D.C. voltage to the connecting point, and means connected to said capacitor for reducing the value of a current flowing through the output impedance of said source of said video signal during the duration in which said switching means is turned on, as compared with that in the case where the last-mentioned means is not provided.

DETAILED DESCRIPTION OF THE PREFERRED EMBODIMENTS

FIG. 1-4 are various circuit diagrams of the last or final stage for a video signal which is to be supplied to a CRT.

Figure 1:
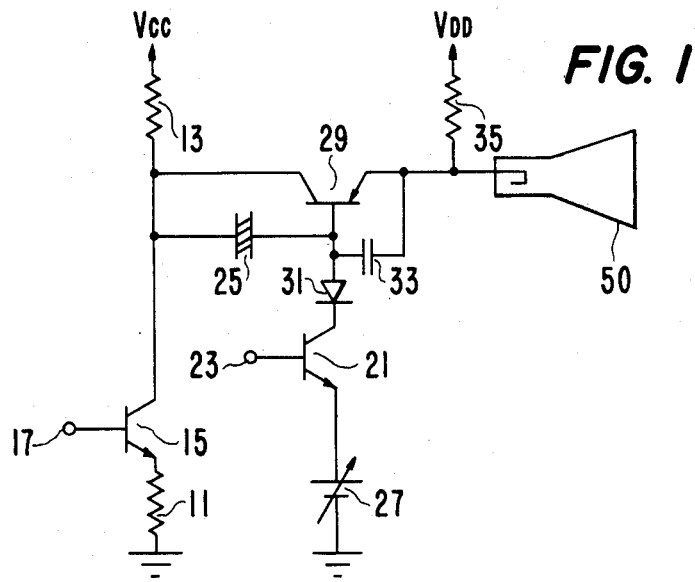
FIGS. 1-4 are schematic circuit diagrams of different embodiments of the present invention.

In FIG. 1, a pre-amplifier stage comprising resistors 11 and 13 and transistor 15 amplifies a video signal supplied to input terminal 17, so that the amplified video signal generated at the collector of transistor 15 has a sufficient amplitude for driving CRT 50. Transistor 21 is turned on during a horizontal retrace period and off during a horizontal scan period by a horizontal synchronizing signal applied to terminal 23. Thus, the D.C. component lost by capacitor 25 during the horizontal scan period is restored by applying a fixed D.C. voltage from a D.C. voltage source 27, whose voltage level is adjustable, to the output side of capacitor 25 during the horizontal retrace period.

During the horizontal scan period, an A.C. component of the amplified video signal from transistor 15 passes through capacitor 25 to the base of transistor 29, which produces a collector current equal to its base circuit amplified by amplification factor $h_{fe}$. The current flowing through capacitor 25 is only $1/1+h_{fe}$ of the A.C. current component of the amplified video signal, because $h_{fe}/1+h_{fe}$ of the A.C. component flows as a collector current of transistor 29. Therefore, the electrical charge at capacitor 25 during the horizontal scan period is far less than that of a case without transistor 29, i.e., the magnitude of the D.C. component to be restored is also less. Accordingly, even if the value of resistsor 13 is increased, the D.C. restoring operation is fully achieved, since the current flowing through resistor 13 to capacitor 25 during the horizontal retrace period is very small.

In this embodiment, diode 31 reduces the capacitance produced between the base of transistor 29 and a reference potential (ground) by the collector-emitter capacitance of transistor 21 in order not to reduce the frequency bandwidth of the amplified video signal. Capacitor 33 of a small capacitance bypasses a high frequency component of the amplified video signal. Resistor 35 prevents the voltage at the cathode from dropping into an undesired lower level which causes an abnormal luminescence on the screen of the CRT and supplies a bias current to transistor 29 to keep it from being turned off.

In this embodiment, since CRT 50 is used as the output device, the operation voltage $V_{DD}$ for the CRT is higher than the operation voltage $V_{cc}$ for the pre-amplifier stage as well as the D.C. voltage source 27

Figure 2:
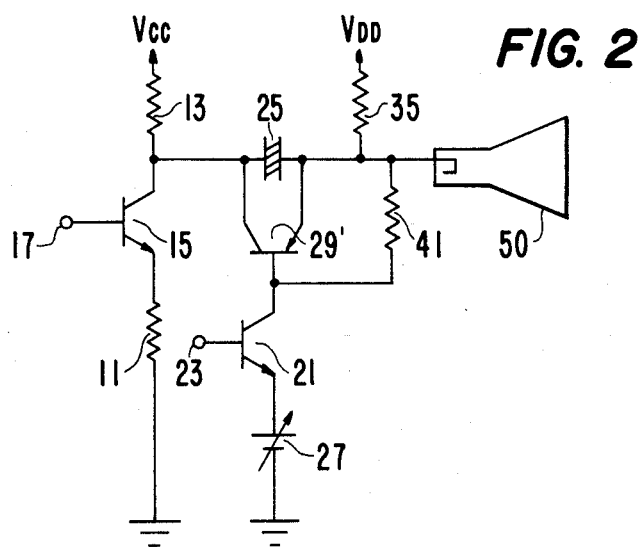

In the embodiemnt of FIG. 2, capacitor 25 is connected in parallel with the emitter-collector path of transistor 29' instead of across the base-collector path of transistor 29, as provided in FIG. 1. Since the emitter-collector path of transistor 29' provides a very low impedance in parallel with capacitor 25 during the horizontal retrace period when transistor 29' is turned on, almost all of the electrical charge stored during the horizontal scan period is discharged through the emitter-collector path and only the base current of transistor 29' flows through resistor 13, which is similar to FIG. 1 in that only the base current of transistor 29 flows through resistor 13. Therefore, the full D.C. restoring operation is achieved even if the value of resistor 13 is increased.

Resistor 41 is provided to bypass from an emitter-base path of transistor 29' a current flowing through a path which may be formed between the base of transistor 29' and ground potential by dust or moisture, which current may turn on transistor 29' during the horizontal scan period if it flows through the emitter-base path of transistor 29'.

Figure 3:
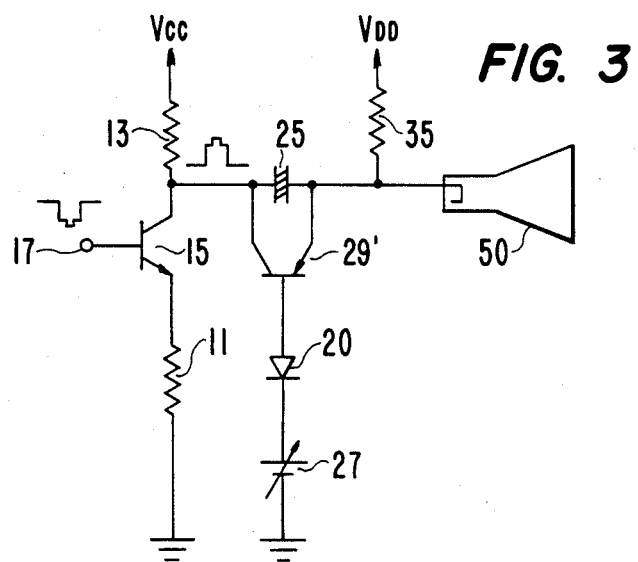

In the embodiment of FIG. 3, transistor 21 is replaced by diode 20, and a composite video signal including a horizontal synchronizing signal component is supplied to input terminal 17. Since the polarity of the amplified composite video signal at the collector of transistor 15 is positive, the emitter-base path of transistor 29' and diode 20 are rendered conductive during a period when the horizontal synchronizing signal appears at the highest level. Therefore, the emitter-collector path of transistor 29' is also conductive during the period of the horizontal synchronizing signal, and the D.C. restoring operation is achieved during this period.

Figure 4:
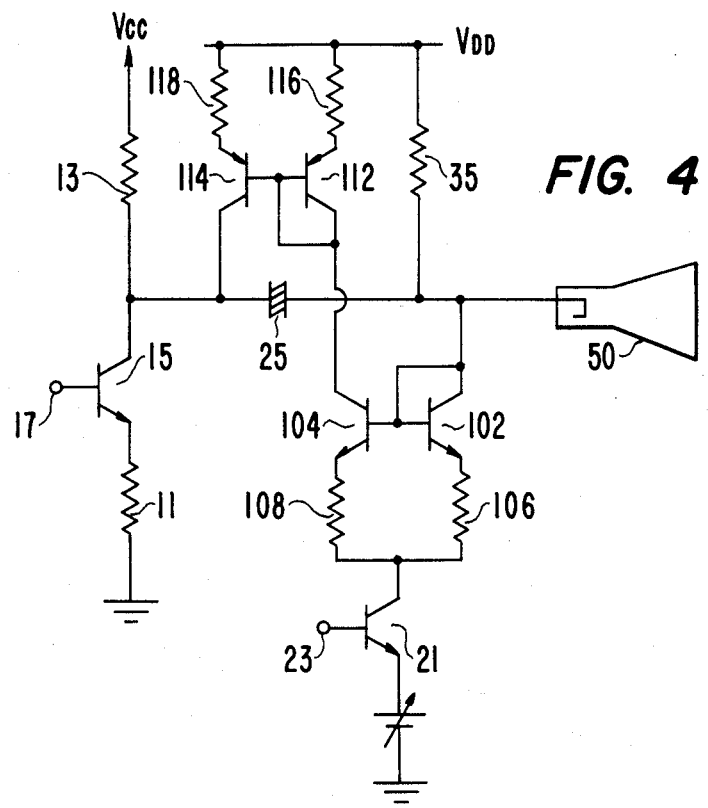

In the embodiment of FIG. 4, there is provided a first current mirror circuit comprising transistors 102 and 104 and resistors 106 and 108, and a second current mirror circuit comprising transistors 112 and 114 and resistors 116 and 118. The two current mirror circuits are operative during the horizontal retrace period and inoperative during the horizontal scan period, because transistor 21 is turned on during the horizontal retrace period and turned off during the horizontal scan period. During the horizontal retrace period, the collector current of transistor 102 of the first current mirror circuit, which current flows from the output side of capacitor 25, is equal to the collector current of transistor 114 of the second current mirror circuit, which current flows to the input side of capacitor 25, since the collector current of each of the transistors 102, 104, 112 and 114 is the same in an operative condition of the first and second current mirror circuits. Thus, the D.C. restoring operation is achieved without the current flowing through resistor 13.

Although a CRT has been provided as the output device in the various embodiments described heretofore, it should be understood that the invention is not limited to use with a CRT. For example, the output device may be another amplifier stage so that the clamp circuit operates to effect D.C. restoration between video amplifier stages.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

What is claimed is:

1. Clamp circuit for a video signal processor comprising:
   a signal source providing a video signal;
   means for processing said video signal supplied thereto;
   a capacitor coupled between said signal source and said processing means for passing said video signal from said signal source to said processing means;
   a D.C. voltage source;
   switching means coupled between said D.C. voltage source and the side of said capacitor coupled to said processing means, for operatively connecting said D.C. source to said capacitor side during a horizontal retrace period and establishing a clamped D.C. restorer level and for disconnecting said D.C. source from said capacitor during a horizontal scan period; and
   current control means connected across said capacitor for reducing the current flowing through an output impedance of said signal source during said horizontal retrace period.

2. Clamp circuit according to claim 1, wherein said current control means comprises means responsive to said switching means for conducting an A.C. component of said video signal therethrough to reduce said A.C. component flowing through said capacitor during the horizontal scan period.

3. Clamp circuit according to claim 2, wherein said current control means comprises a transistor having a collector connected to the side of said capacitor connected to said signal source, a base electrode connected to the other side of said capacitor and an emitter electrode connected to said processing means.

4. Clamp circuit according to claim 3, wherein said current control means further comprises another capacitor connected between said base electrode and said emitter electrode of said transistor.

5. Clamp circuit according to claim 4, wherein said current control means further comprises a resistor connected between another D.C. voltage source whose voltage is higher than that of said first mentioned D.C. voltage source and said emitter electrode.

6. Clamp circuit according to claim 1, wherein said current control means comprises means responsive to said switching means for conducting a discharge current of said capacitor therethrough to reduce said discharge current flowing through said output impedance of said signal source during said horizontal retrace period.

7. Clamp circuit according to claim 6, wherein said current control means comprises a transistor having an emitter-collector path connected in parallel with said capacitor and a base electrode connected to said switching means.

8. Clamp circuit according to claim 7, wherein said current control means further comprises a resistor connected between said base electrode of said transistor and one side of said capacitor.

9. Clamp circuit according to claim 7, wherein said switching means comprises a diode.

10. Clamp circuit according to claim 6, wherein said current control means comprises a first current source connected to one side of said capacitor and a second current source connected to the other side of said capacitor which is connected to said signal source, the directions of the output currents provided by said first and second current sources being different from each other, and each of said first and second current sources being operative during said horizontal retrace period.

11. Clamp circuit according to claim 10, wherein each of said first and second current sources comprises a current mirror circuit.

12. Clamp circuit according to claim 1, wherein said switching means comprises a transistor having a collector-emitter conducting path connecting said D.C. voltage source to said current control means in response to a horizontal synchronizing signal at its base.

13. The circuit according to claim 6, wherein said switching means comprises a transistor having a collector emitter path for connecting said D.C. voltage source to said current control means in response to a horizontal synchronizing signal at its base.

14. Clamp circuit for a video signal processor comprising:
amplifier means for providing an amplified video signal;
display means having an input electrode connected to receive said amplified video signal;
a capacitor coupled between an output of said amplifier means and said input electrode of said display means;
a D.C. voltage source;
current path means connected across said capacitor, having a condutive state and a non-conductive state; and
control means for applying a D.C. voltage from said D.C. voltage source to said display means and for controlling said current path means to be conductive during a horizontal retrace period and for disconnecting said D.C. voltage source from said input electrode of said display means and controlling said current path means to be non-conductive during a horizontal scan period and thereby establishing a clamped D.C. restorer level at said input electrode.

15. A circuit for a video signal processor comprising:
a signal source providing a video signal;
processing means, having an input, and responsive to said video signal supplied thereto; and
a clamp circuit establishing a D.C. restorer level at the input of said processing means, comprising:
(1) a capacitor coupled between said signal source and said processing means input for passing said video signal from said signal source to said processing means;
(2) a D.C. voltage source;
(3) switching means coupled between said D.C. voltage source and the side of said capacitor coupled to the input of said processing means, for operatively connecting said D.C. source to said capacitor during a horizontal retrace period and for disconnecting said D.C. source from said capacitor during a horizontal scan period; and
(4) current control means connected across said capacitor for reducing the current flowing through an output impedance of said signal source during said horizontal retrace period.

16. The clamp circuit according to claim 15, wherein said current control means comprises means responsive to said switching means for conducting an A.C. component of said video signal therethrough to reduce said A.C. component flowing through said capacitor during the horizontal scan period.

17. The clamp circuit according to claim 16, wherein said current control means comprises a transistor having a collector coupled to the side of said capacitor connected to said signal source, a base electrode connected to the other side of said capacitor and an emitter electrode connected the input of said processing means.

18. The clamp circuit according to claim 17, wherein said current control means further comprises another capacitor connected between said base electrode and said emitter electrode of said transistor.

19. The clamp circuit according to claim 18, wherein said current control means further comprises a resistor connected between another D.C. voltage source whose voltage is higher than that of said first mentioned D.C. voltage source and said emitter electrode.

20. The clamp circuit according to claim 15, wherein said current control means comprises means responsive to said switching means for conducting a discharge current of said capacitor therethrough to reduce said discharge current flowing through said output impedance of said signal source during said horizontal retrace period.

21. The clamp circuit according to claim 20, wherein said current control means comprises a transistor having an emitter-collector path connected in parallel with said capacitor and a base electrode connected to said switching means.

22. The clamp circuit according to claim 21, wherein said current control means further comprises a resistor connected between said base electrode of said transistor and one side of said capacitor.

23. The clamp circuit according to claim 21, wherein said switching means comprises a diode.

24. The clamp circuit according to claim 20, wherein said current control means comprises a first current source connected to one side of said capacitor and a second current source connected to the other side of said capacitor which is connected to said signal source, the directions of the output currents provided by said first and second current sources being different from each other, and each of said first and second current sources being operative during said horizontal retrace period.

25. The clamp circuit according to claim 24, wherein each of said first and second current sources comprises a current mirror circuit.

26. The circuit according to claim 20, wherein said switching means comprises a transistor having a collector emitter path for connecting said D.C. voltage source to said current control means in response to a horizontal synchronizing signal at its base.

27. The circuit according to claim 15, wherein said switching means comprises a transistor having a collector emitter path for connecting said D.C. voltage source to said current control means in response to a horizontal synchronizing signal at its base.

28. A circuit for a video signal processor comprising:
amplifier means for providing an amplified video signal;
display means having an input electrode connected to receive said amplified video signal; and
a clamp circuit establishing a clamped D.C. restorer level at said input electrode, comprising:
(1) a capacitor coupled between an output of said amplifier means and said input electrode of said display means;
(2) a D.C. voltage source;
(3) current path means connected across said capacitor, having a conductive state and a non-conductive state; and
(4) control means coupled to the side of said capacitor connected to said input electrode for applying a D.C. voltage from said D.C. voltage source to said display means and for controlling said current path means to be conductive during a horizontal retrace period and for disconnecting said D.C. voltage source from said input electrode of said display means and controlling said current path means to be non-conductive during a horizontal scan period.

* * * * *